(12) United States Patent
Fukumoto et al.

(10) Patent No.: US 9,388,063 B2
(45) Date of Patent: Jul. 12, 2016

(54) METHODS FOR MANUFACTURING MOLDED GLASS OBJECT AND UPPER MOLD

(76) Inventors: Naoyuki Fukumoto, Amagasaki (JP); Shunichi Hayamizu, Amagasaki (JP); Kento Hasegawa, Sakai (JP)

( * ) Notice: Subject to any disclaimer, the term of this patent is extended or adjusted under 35 U.S.C. 154(b) by 706 days.

(21) Appl. No.: 12/589,214

(22) Filed: Oct. 19, 2009

(65) Prior Publication Data

US 2010/0101276 A1    Apr. 29, 2010

(30) Foreign Application Priority Data

Oct. 24, 2008  (JP) ................. 2008-274199

(51) Int. Cl.
| | |
|---|---|
| *C03B 11/00* | (2006.01) |
| *C03B 11/08* | (2006.01) |
| *B44B 5/02* | (2006.01) |
| *B44C 1/22* | (2006.01) |
| *B44C 5/04* | (2006.01) |
| *C23F 1/26* | (2006.01) |

(52) U.S. Cl.
CPC ............. *C03B 11/086* (2013.01); *B44B 5/026* (2013.01); *B44C 1/221* (2013.01); *B44C 1/227* (2013.01); *B44C 5/0407* (2013.01); *B44C 5/0453* (2013.01); *C23F 1/26* (2013.01); *C03B 2215/03* (2013.01); *C03B 2215/16* (2013.01); *C03B 2215/20* (2013.01); *C03B 2215/30* (2013.01); *C03B 2215/65* (2013.01)

(58) Field of Classification Search
CPC ............ C03B 2215/65; C03B 2215/00; C03B 2215/03; C03B 2215/14; C03B 2215/22; C03B 2215/24; C03B 2215/26

USPC ................................... 65/64, 66, 102
See application file for complete search history.

(56) References Cited

U.S. PATENT DOCUMENTS

| | | | |
|---|---|---|---|
| 3,244,497 A * | 4/1966 | Copeland ..................... 65/162 |
| 4,046,545 A * | 9/1977 | Sanford et al. ................ 65/30.12 |
| 4,139,677 A * | 2/1979 | Blair et al. .................... 428/409 |
| 4,747,864 A * | 5/1988 | Hagerty et al. ................. 65/102 |
| 4,921,519 A * | 5/1990 | Schinker et al. ................. 65/39 |
| 5,662,999 A * | 9/1997 | Taniguchi et al. ............. 428/408 |

(Continued)

FOREIGN PATENT DOCUMENTS

| | | |
|---|---|---|
| JP | 02-102134 | 4/1990 |
| JP | 03137031 A * | 6/1991 |

(Continued)

OTHER PUBLICATIONS

English language translation of JP 2820728 B2.*

(Continued)

*Primary Examiner* — Jason L Lazorcik
(74) *Attorney, Agent, or Firm* — Brinks Gilson & Lione (57) ABSTRACT

This invention provides a manufacturing method of a molded glass object in which generation of defects such as dents and wrinkles due to catching of ambient gas between a molten glass drop and an upper mold is restrained in the case of manufacturing a molded glass object by press-molding of a dropped molten glass drop, and a manufacturing method of an upper mold for the manufacturing method of a molded grass object. A molten glass drop is press-molded by use of an upper mold having been subjected to a roughening treatment to roughen the surface on the molding surface to compress the molten glass drop.

2 Claims, 8 Drawing Sheets

(56) References Cited

U.S. PATENT DOCUMENTS

| | | | | |
|---|---|---|---|---|
| 6,119,485 | A * | 9/2000 | Hibino et al. | 65/305 |
| 7,094,452 | B2 * | 8/2006 | Yamashita et al. | 428/1.3 |
| 7,174,745 | B2 * | 2/2007 | Kunert et al. | 65/169 |
| 7,320,231 | B2 * | 1/2008 | Hosoe | 65/374.12 |
| 7,383,697 | B2 * | 6/2008 | Hosoe et al. | 65/102 |
| 7,383,701 | B2 * | 6/2008 | Hosoe | 65/374.12 |
| 7,611,648 | B2 * | 11/2009 | Wolfing et al. | 264/2.4 |
| 8,099,982 | B2 * | 1/2012 | Takagi et al. | 65/305 |
| 8,245,537 | B2 * | 8/2012 | Kawai | 65/66 |
| 8,365,554 | B2 * | 2/2013 | Fukumoto et al. | 65/66 |
| 8,449,284 | B2 * | 5/2013 | Ohgane | 425/385 |
| 8,505,338 | B2 * | 8/2013 | Hayamizu et al. | 65/66 |
| 2003/0121286 | A1 * | 7/2003 | Takagi et al. | 65/64 |
| 2003/0180476 | A1 * | 9/2003 | Yamashita et al. | 428/1.1 |
| 2004/0194510 | A1 * | 10/2004 | Hosoe | 65/303 |
| 2004/0196567 | A1 * | 10/2004 | Hosoe | 359/642 |
| 2004/0211222 | A1 * | 10/2004 | Hosoe | 65/374.12 |
| 2005/0249919 | A1 * | 11/2005 | Wolfing et al. | 428/156 |
| 2005/0268660 | A1 * | 12/2005 | Hosoe et al. | 65/102 |
| 2006/0037363 | A1 * | 2/2006 | Wang | 65/374.11 |
| 2006/0144093 | A1 * | 7/2006 | Hosoe | 65/374.12 |
| 2008/0055736 | A1 * | 3/2008 | Tsuji et al. | 359/654 |
| 2010/0071416 | A1 * | 3/2010 | Kawai | 65/61 |
| 2010/0101276 | A1 * | 4/2010 | Fukumoto et al. | 65/66 |
| 2010/0126220 | A1 * | 5/2010 | Hayamizu et al. | 65/85 |
| 2010/0180635 | A1 * | 7/2010 | Fukumoto et al. | 65/26 |
| 2010/0229600 | A1 * | 9/2010 | Fukumoto et al. | 65/66 |
| 2010/0313603 | A1 * | 12/2010 | Fukumoto et al. | 65/66 |
| 2011/0011133 | A1 * | 1/2011 | Moseler et al. | 65/61 |
| 2011/0023546 | A1 * | 2/2011 | Hayamizu et al. | 65/83 |
| 2011/0162412 | A1 * | 7/2011 | Fukumoto et al. | 65/66 |
| 2011/0247365 | A1 * | 10/2011 | Hayakawa et al. | 65/66 |

FOREIGN PATENT DOCUMENTS

| | | |
|---|---|---|
| JP | 06-340433 | 12/1994 |
| JP | 2005-272187 | 10/2005 |

OTHER PUBLICATIONS

English language translation of JP 8-133762.*
English langugage translation of JP 3-137031.*
English language translation of Saito (JP 2002-003225A).*
Takahashi (Takahashi et. al., "nanoimprint of glass materials with glassy carbon molds fabricated by focused-ion-beam etching", Japanese Journal of Applied Physics, v.44, N.7B, 2005, pp. 5600-5605).*
Walker (Walker, P., Tarn, W., "CRC Handbook of Metal Etchants", (1991), ISBN 0-8493-3623-6; pp. 255, 1092, 1268.*
Machine Translation of JP 28273337 B (Granted version of JP 03-137031).*
Schneider, J.J., Rice, R.W. eds., The Science of Ceramic Machining and Surface Finishing: Proceedings of a Symposium Sponsored by the American Ceramic Society, The Office of Naval Research, and the National Bureau of Standards, Nov. 2-4, 1970, held at NBS, Gaithersburg, Maryland, National Bureau of Standards Special Publication 348, (1972), pp.*
Japanese Office Action dated Jul. 10, 2012 for co-pending Japanese Patent Application No. 2008-274199.

* cited by examiner

METHODS FOR MANUFACTURING MOLDED GLASS OBJECT AND UPPER MOLD

This application is based on Japanese Patent Application No. 2008-274199 filed on Oct. 24, 2008, in Japanese Patent Office, the entire content of which is hereby incorporated by reference.

TECHNICAL FIELD

The present invention relates to a manufacturing method of a molded glass object by press-molding of a molten glass drop and a manufacturing method of an upper mold utilized for said manufacturing method.

BACKGROUND

In recent years, optical elements made of glass are utilized in a wide range of applications as a lens for digital cameras, an optical pick up lens for DVDs, a camera lens for cell phones and a coupling lens for optical communication. As such glass optical elements, molded glass objects manufactured by press-molding of a glass material by use of a molding die are widely utilized.

As a manufacturing method of molded glass objects, known are a method in which a glass preform having a predetermined weight and form is prepared in advance and said glass preform is heated together with a molding die to be subjected to press-molding (hereinafter, also referred to as "a reheat press method"), and a method in which a dropped molten glass drop is received by an under mold and the received molten glass drop is subjected to press-molding to prepare a molded glass object (hereinafter, also referred to as "a liquid drop molding method"). Particularly, the latter method gathers attention for a very short cycle time for molding. By that method, it is possible to manufacture a molded glass object directly from a molten glass drop without repeated heating and cooling of the molding die.

However, in either of the above-described methods, there has been a problem that a molded glass object may have defects such as dents and wrinkles created by ambient gas caught between a glass material and an upper mold in a process where the glass material is deformed along the molding surface of the upper mold at the time of press-molding.

To overcome such a problem, there has been proposed a method to prevent ambient gas from being caught by providing a chamfering treatment on the outer edge of a glass preform to make the outer edge of a glass preform not contact with a molding die (for example, Japanese Laid-Open Patent Application Publication No. H02-102134), and a method to perform setting of such as a molding die and a glass preform under vacuum (for example, Japanese Laid-Open Patent Application Publication No. H06-340433).

However, in the liquid drop molding method, it is impossible to employ a method using a glass preform having a complicated shape as described in Japanese Laid-Open Patent Application Publication No. H02-102134 because a molten glass drop having been received by an under mold is subjected to press-molding in the liquid drop molding method. Further, in the case of applying a method described in Japanese Laid-Open Patent Application Publication No. H06-340433 to the liquid drop molding method, there was a problem of very large facilities being required to perform the whole processes in vacuum, from dropping of a molten glass drop to press-molding.

SUMMARY

This invention has been made in view of the above-described technical problems, and an object of this invention is to provide a manufacturing method of a molded glass object, by press-molding of a molten glass drop having been dropped, which can restrain generation of defects such as dents and wrinkles due to ambient gas caught between a molten glass drop and an upper mold, and a manufacturing method of an upper mold to be utilized in said method.

In view of forgoing, one embodiment according to one aspect of the present invention is a method for manufacturing a molded glass object, the method comprising the steps of:
 dropping a molten glass drop onto a lower mold; and
 press-molding the dropped molten glass drop between the lower mold and an upper mold facing the lower mold,
 wherein the upper mold has a molding surface for pressing the molten glass drop, and the molding surface is roughened.

According to another aspect of the present invention, another embodiment is a method for manufacturing an upper mold for press-molding a molten glass drop dropped on a lower mold, the method comprising the step of:
 roughening a surface of a molding surface, of the upper mold, for pressing the molten glass drop.

DETAILED DESCRIPTION OF THE PRESENT EMBODIMENT

Figure 1:
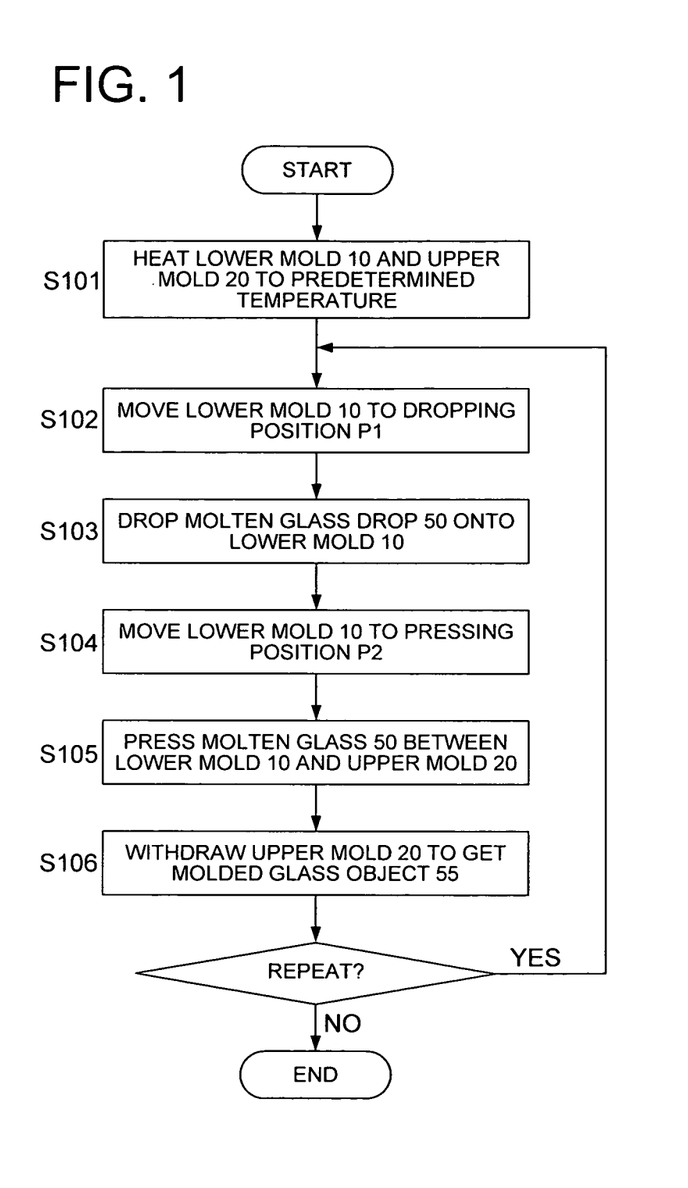
FIG. 1 is a flow chart of a manufacturing method of a molded glass object.
Figure 2:
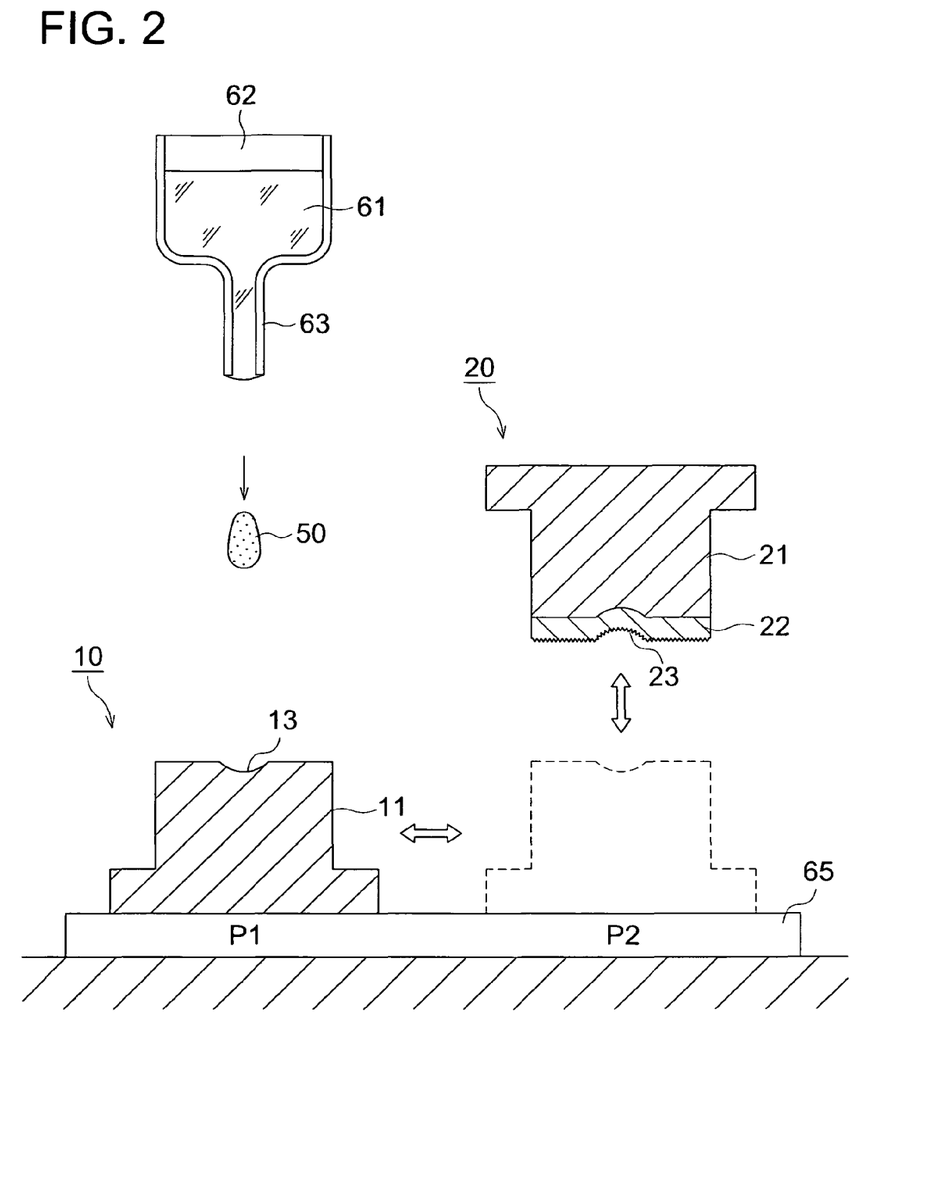
FIG. 2 is a schematic drawing of a manufacturing apparatus, in the state of step S103, for a molded glass object.
Figure 3:
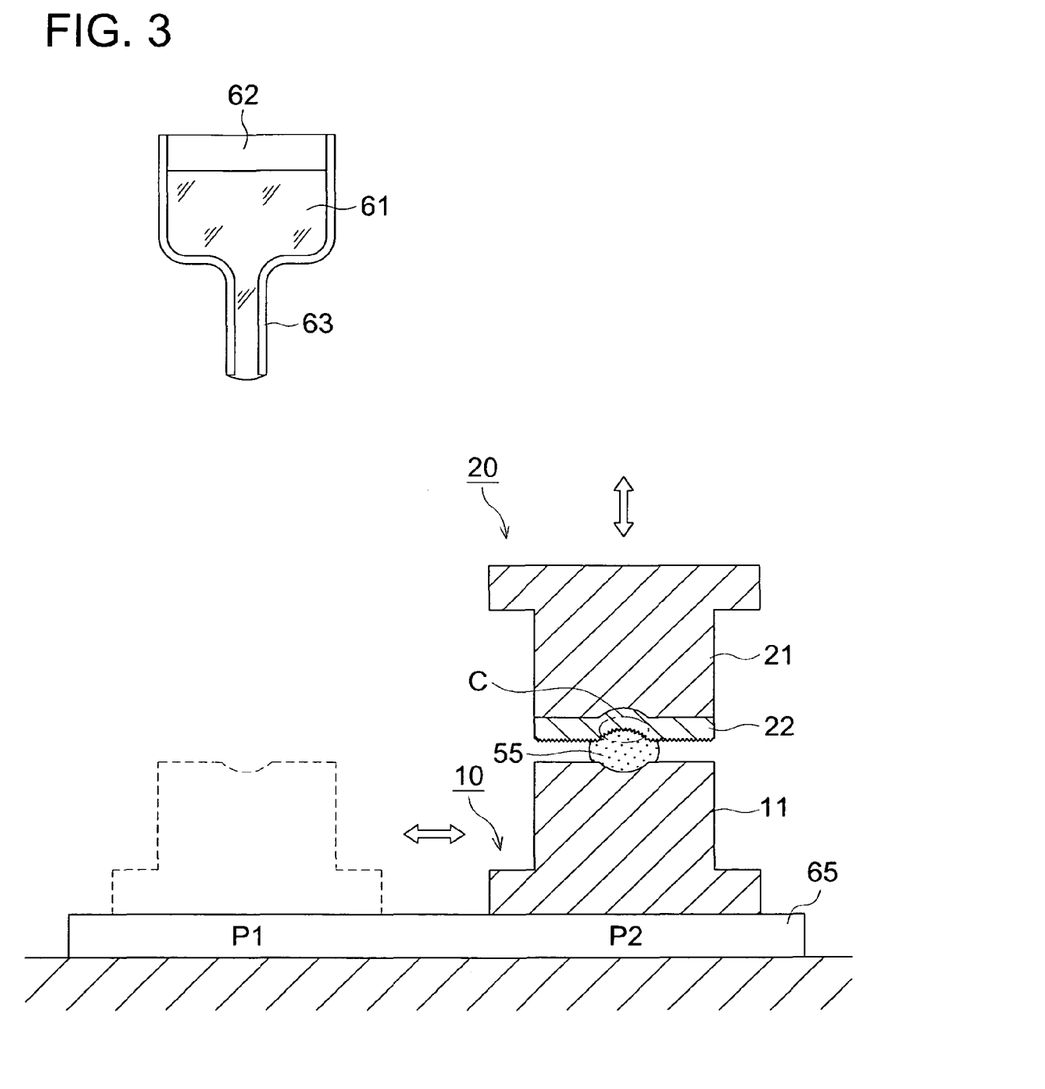
FIG. 3 is a schematic drawing of the manufacturing apparatus, in the state of step S105, of a molded glass object.

In the following, an embodiment of this invention will be detailed in reference to FIGS. 1 through 9.
(Manufacturing Method of Molded Glass Object)
A manufacturing method of a molded glass object, which is an example of an embodiment of this invention, will be explained in reference to FIGS. 1 through 3. FIG. 1 is a flow chart of a manufacturing method of a molded glass object in this embodiment. Further, FIG. 2 and FIG. 3 are schematic drawings of a manufacturing apparatus for a molded glass object utilized in this embodiment. FIG. 2 shows a state of step (S103) to drop a molten glass drop into an under mold and FIG. 3 shows a state of step (S105) to compress a molten glass drop having been dropped with an upper mold and a lower mold.

A manufacturing apparatus of a molded glass object shown in FIG. 2 and FIG. 3 is provided with lower mold 10 and upper mold 20 as molding dies to compress molten glass drop 50. In upper mold 20, cover layer 22 is formed on substrate 21 and roughening treatment to roughen the surface is performed on molding surface 23 which compresses molten glass drop 50. Material for substrate 21 can be appropriately selected to use depending on conditions from materials well known as a material for a molding die for press-molding of a glass material. Materials preferably utilized include various types of heat resistant alloy (such as stainless), supper hard materials comprising tungsten carbide as a primary component, various types of ceramics (such as silicon carbide and silicon nitride) and composite materials containing carbon. Cover layer 22 is not an indispensable constituent element, however, it is preferable to form cover layer 22 in view of prevention of substrate 21 from receiving damage. Details of a material and a forming method of cover layer 22, and a method for a roughening treatment will be described later.

On the other hand, molding surface 13 of lower mold 10 is not necessarily subjected to a roughening treatment. However, it is preferable to subject molding surface 13 of lower mold 10 to a roughening treatment similarly to molding surface 23 of upper mold 20 in view of prevention of defect generation due to sealing of environmental gas between a molten glass drop and lower mold 10. A material of substrate 11 of lower mold 10 and a material of substrate 21 of upper mold 21 may be the same or different.

Lower mold 10 and upper mold 20 are configured to be heated to a predetermined temperature, by a heating means which is not shown in the drawing. As a heating means, a well known heating means can be appropriately selected to use. For example, listed are a cartridge heater which is used by being incorporated in the inside of lower mold 10 as well as upper mold 20, a sheet form heater utilized by being brought in contact with the outside, and an infrared ray heating device and a high frequency induction heating device. It is more preferable that lower mold 10 and upper mold 20 are each configured to be independently temperature-controlled.

Lower mold 10 is configured to be movable along guide 65 between the position for receiving molten glass drop 50 (dropping position P1) and the position for performing the press-molding opposing to upper mold 20 (pressing position P2), by a drive means which is not shown in the drawing. Further, upper mold 20 is configured to be movable in the direction of compressing molten glass drop 50 (up and down direction in the drawing) by a drive means which is not shown in the drawing. It should be noted that this invention is described referring to an example in which only upper mold 20 is shifted in the pressing direction, however, this invention is not limited thereto, and lower mold 10 is moved in the pressing direction, or the both of lower mold 10 and upper mold 20 are moved along the pressing direction.

Further, above dropping position P1, dropping nozzle 63 to drop molten glass drop 50 is arranged. Dropping nozzle 63 is configured to be connected to the bottom of a melting bath which is heated with a heater not shown in the drawing and stores molten glass 61, and to drop molten glass drop 50 through the top portion.

In the following, each step will be explained in order according to the flow chart shown in FIG. 1.

First, lower mold 10 and upper mold 20 are heated to a predetermined temperature (step S101). The predetermined temperature is an appropriately selected temperature for a good transfer surface to be formed by press-molding on a molded glass object. When temperature of lower mold 10 or upper mold 20 is too low, large wrinkles are easily formed on a molded glass object, and the precision of the transfer surface may be deteriorated. On the contrary, when temperature is too high, the mold and a molded glass object may be fused together, and the life of lower mold 10 or upper mold 20 may be shorten. In practice, it is preferable to experimentally determine a suitable temperature because a suitable temperature depends on various conditions such as the type, shape and size of glass; and the material and size of lower mold 10 and upper mold 20. Generally, the temperature is preferably set approximately between Tg−100° C. and Tg+100° C., when a glass transition temperature of utilized glass is assumed as Tg. The heating temperatures of lower mold 10 and upper mold 20 may be the same or different from each other.

Next, lower mold 10 is shifted to dropping position P1 (step S102) and molten glass drop 50 is dropped from dropping nozzle 63 (step S103) (refer to FIG. 2). Dropping of molten glass drop 50 is performed by heating dropping nozzle 63, which is connected to melting bath 62 which stores molten glass 61, to a predetermined temperature. When dropping nozzle 63 is heated to a predetermined temperature, molten glass 61 stored in melting bath 62 is supplied to the top portion of dropping nozzle 63 owing to dead weight and is kept in a liquid drop state owing to surface tension. When melted glass is supplied to a certain mass at the top portion of dropping nozzle 63, the melted glass is separated from dropping nozzle 63 due to gravity and dropped as molten glass drop 50.

The mass of molten glass drop 50 dropping through nozzle through 63 can be adjusted by the outer diameter of dropping nozzle 63, and melted glass of approximately 0.1-2 g can be dropped, although it depends on the type of glass. Alternatively, micronized molten glass drops can be made by causing molten glass drop 50 dropped through dropping nozzle 63 to collide against a member having micro pores passing therethrough so that a part of molten glass drop having collided pass through the micro pores, and the micronized molten glass drop may be dropped onto lower mold 10. This arrangement can produce a minute glass gob with a weight of 0.001 g, and a smaller glass gob can be made compared to the case of receiving molten glass drop 50 with lower mold 10 directly from dropping nozzle 63. Please note that the interval between droppings of molten glass drops 50 from dropping nozzle 63 can be adjusted depending on the inner diameter, length or heating temperature of dropping nozzle 63.

Any type of glass can be used without limitation, and appropriate kind of well known glass is selectively used depending on applications. For example, listed are optical glass such as borosilicate glass, silicate glass, phosphate glass and lanthanum type glass.

Next, lower mold 10 is shifted to pressing position P2 (step S104) and upper mold 20 is moved downward to perform press-molding of molten glass drop 50 with lower mold 10 and upper mold 20 (step S105) (refer to FIG. 3). During press-molding, molten glass drop 50 received by lower mold 10 is cooled with its heat radiated through its surface in contact with lower mold 10 and upper mold 20, whereby the glass drop is solidified to be molded glass object 55. In this embodiment, since molding surface 23 of upper mold 20 (the surface of cover layer 22) has been subjected to a surface roughening treatment to roughen the surface, a gas can easily flow through the depressed portion of irregularity formed on the surface. Therefore, it is possible to restrain generation of defects such as dents and wrinkles on molded glass object 55 free from residual environmental gas between molten glass drop 50 and upper mold 20 at the time of press-molding. When molded glass object 55 is cooled to a predetermined temperature, upper mold 20 is moved upward to release compression. It is generally preferable to release pressing after cooling to a temperature close to Tg of glass, although it depends on the type of glass, the size, form and required precision of molded glass object 55.

The load to be applied for pressing of molten glass drop 50 may be always constant or may be varied with time. The magnitude of load to be applied is appropriately set depending on the size of molded glass object 55 to be manufactured. Further, driving means to move upper mold 20 up and down is not limited, and a well known driving means such as an air cylinder, an oil cylinder and a motor cylinder using a servo motor can be appropriately selected to be used.

Thereafter, upper mold 20 is upwardly withdrawn and molded glass object 55 having been solidified is recovered (step S106), whereby manufacturing of a molded glass object is completed. Then, when molded glass object is successively performed, lower mold 10 is shifted again to dropping position P1 (step S32) and the following steps are repeated. Herein, a manufacturing method of molded glass objects of this embodiment may include other steps in addition to those explained above. For example, provided may be a step to inspect the form of a molded glass object before recovering the molded glass object, or a step to clean lower mold 10 or upper mold 20 after recovering a molded glass object.

A molded glass object manufactured by a manufacturing method of this embodiment can be used as various types of optical elements, for example, an image pickup lens for a digital camera, an optical pick-up lens for a DVD, and a coupling lens for optical communication. It can be also used as a glass preform to be used in manufacturing of various optical elements made by a reheat press method.

Figure 4A:
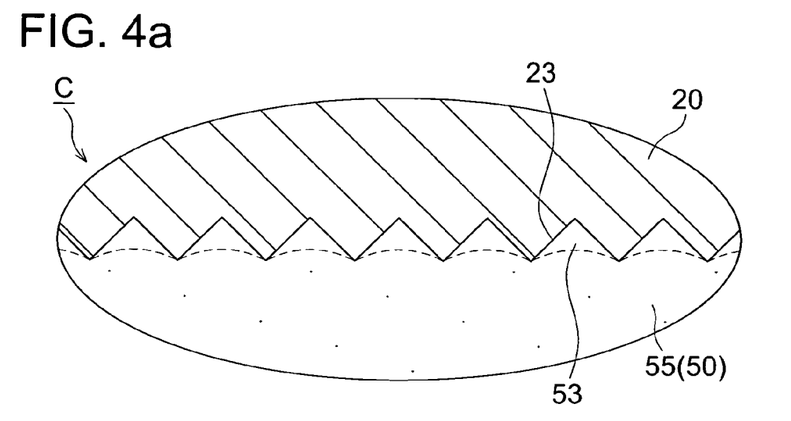
FIGS. 4a, 4b and 4c are magnified drawings of the boundary portion (C portion in FIG. 3) of an upper mold and a molten glass drop.
Figure 4B:
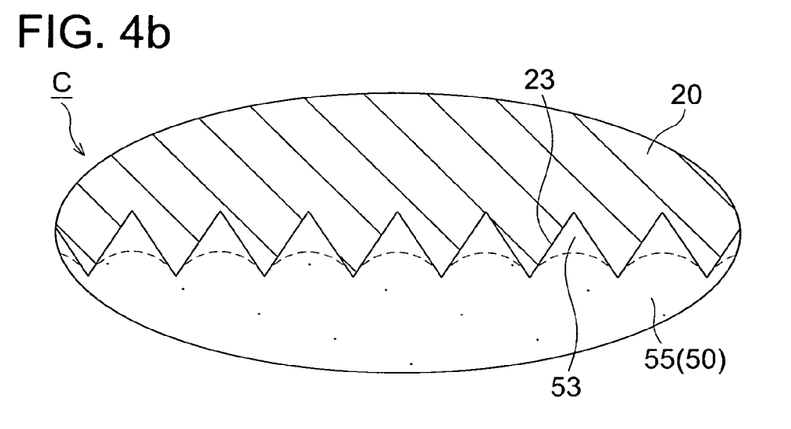
Figure 4C:
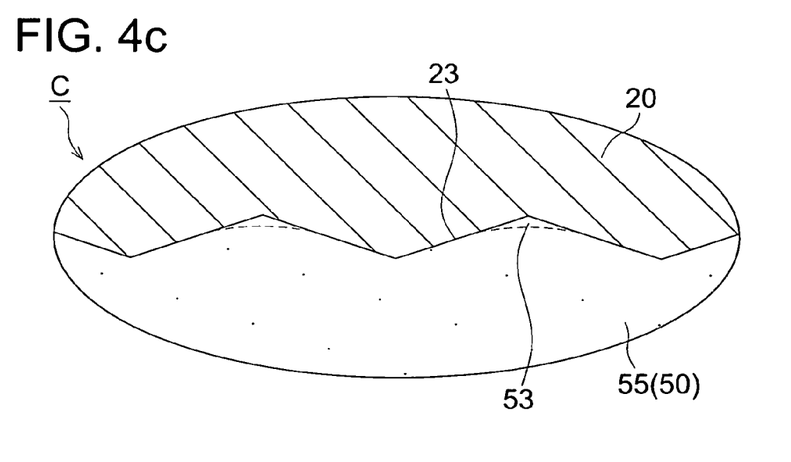

The reason why generation of defects dents on molded glass object 55 can be controlled by providing molding surface 23 of upper mold 20 with a roughening treatment will now be detailed referring to FIGS. 4a, 4b and 4c. FIGS. 4a, 4b and 4c are enlarged drawings of the boundary portion (C portion in FIG. 3) between upper mold 20 and molten glass drop 50 at the time of press-molding of molten glass drop 50 in step S105.

At the time of press-molding of molten glass drop 50, when environmental gas is caught between molten glass drop 50 and upper mold 20 in the process where molten glass drop 50 deforms along molding surface 23 of upper mold 20, the caught gas may be a cause of defects such as dents on molded glass object 55. However, in this embodiment, molding surface 23 of upper mold 20 is roughened by a roughening treatment as shown in FIG. 4a. Since a surface tension acts on the surface of molten glass drop 50, the molten glass does not completely fill in the valley portions of roughness with gap 53 left between molten glass drop 50 and upper mold 20. Since this gap 53 works as a passage for gas and prohibits ambient gas from residing between molten glass drop 50 and upper mold 20, it is possible to effectively restrain generation of defects such as dents on molded glass object 55.

Formation of gap 53 between molten glass drop 50 and upper mold 20 depends on the height and cycle of roughness on molding surface 23. The height of roughness of molding surface 23 is larger in FIG. 4b than in FIG. 4a although the cycle of roughness is the same. When the roughness is relatively large as in this case, gap 53 having a sufficient size is formed, thereby more effectively controlling the generation of defects such as dents. However, when the height of roughness is too large, the surface of molded glass object 55 may be provided with large depression and projection to make the surface roughness too large. On the contrary, when the height of roughness is too small, glass is easily fills in the valley portions of roughness, thereby weakening the effect of controlling generation of defect. On the other hand, the cycle of roughness of molding surface 23 is larger in FIG. 4c than in FIG. 4a although the height of roughness is the same. When the cycle of roughness is larger and the height of roughness is the same as mentioned above, glass may easily fill in the valley of roughness, thereby making gap 53 smaller and weakening the effect of controlling generation of defects. From these view points, molding surface 23 is preferably provided with an arithmetical average roughness (Ra) of 0.01 through 0.2 μm and an average length of roughness curve elements (RSm) of not more than 0.5 μm, more preferably not more than 0.2 μm.

(Manufacturing Method of Upper Mold)

Figure 5A:
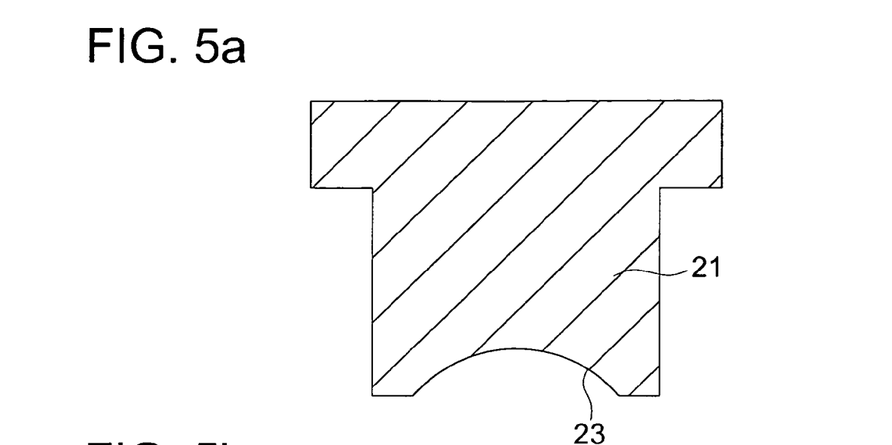
FIGS. 5a, 5b and 5c are cross-sectional drawings to show states of an upper mold in different step.
Figure 5B:
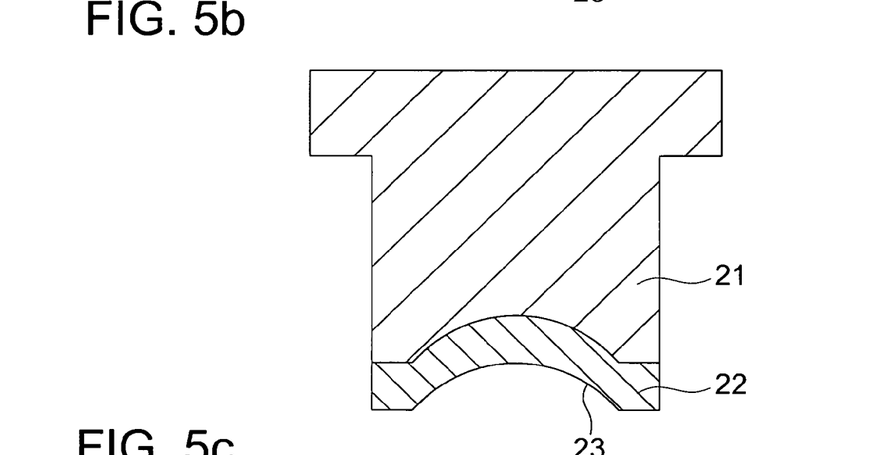
Figure 5C:
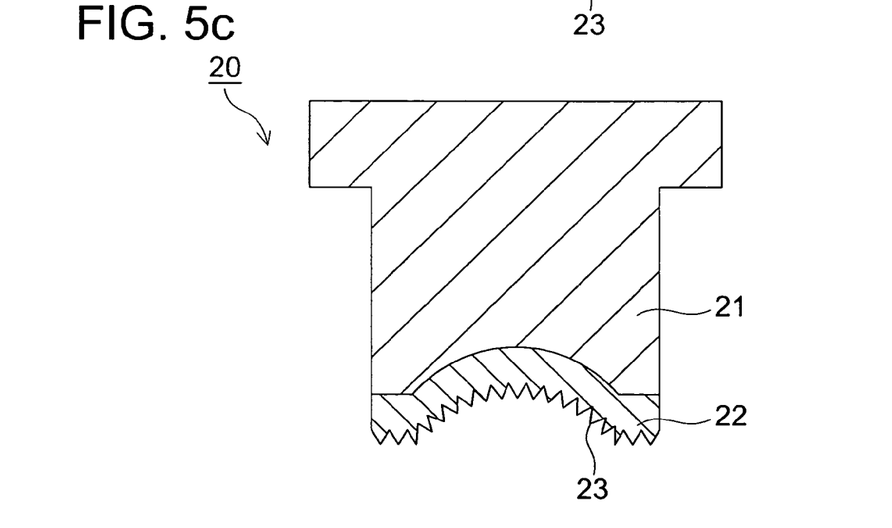
Figure 6:
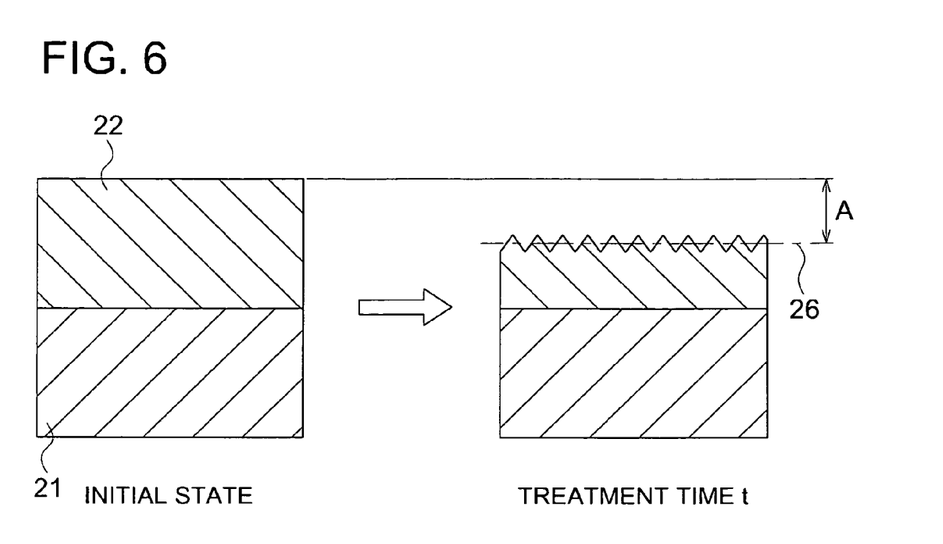
FIG. 6 is a schematic drawing to explain the meaning of an etching rate.
Figure 7A:
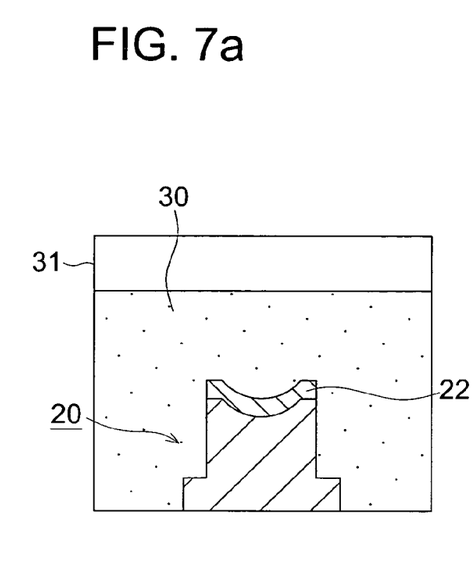
FIGS. 7a, 7b, 7c and 7d are cross-sectional drawings to show a wet etching method.
Figure 7B:
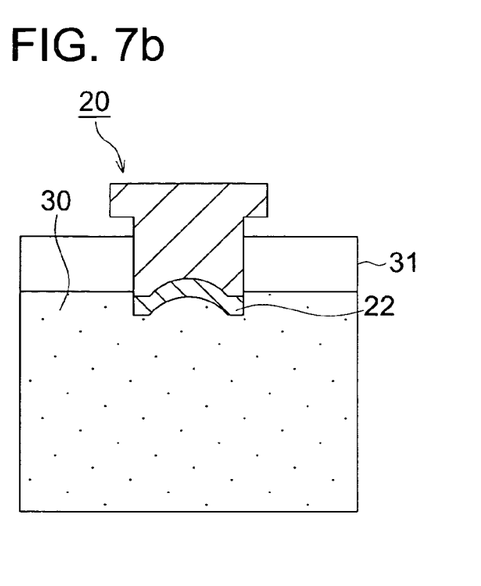
Figure 7C:
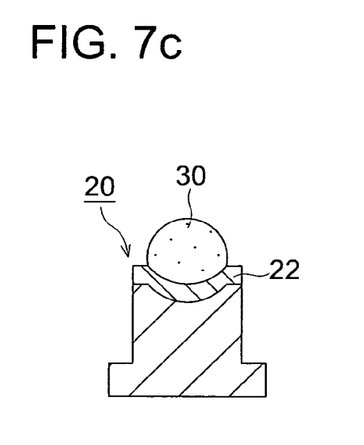
Figure 7D:
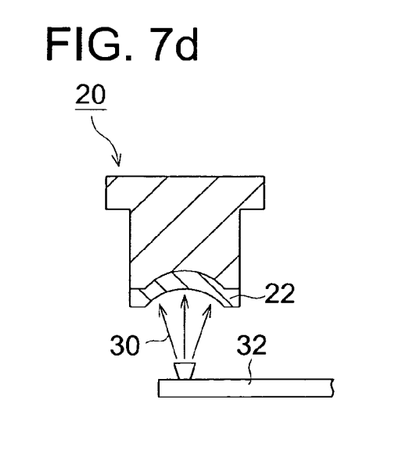
Figure 8A:
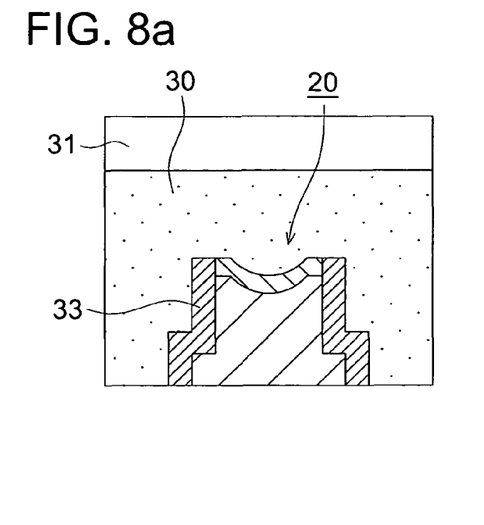
FIGS. 8a and 8b are cross-sectional drawings to show a wet etching method utilizing a mask.
Figure 8B:
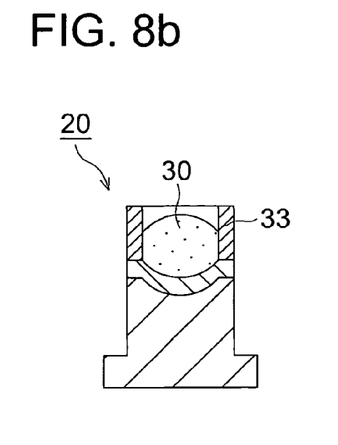
Figure 9:
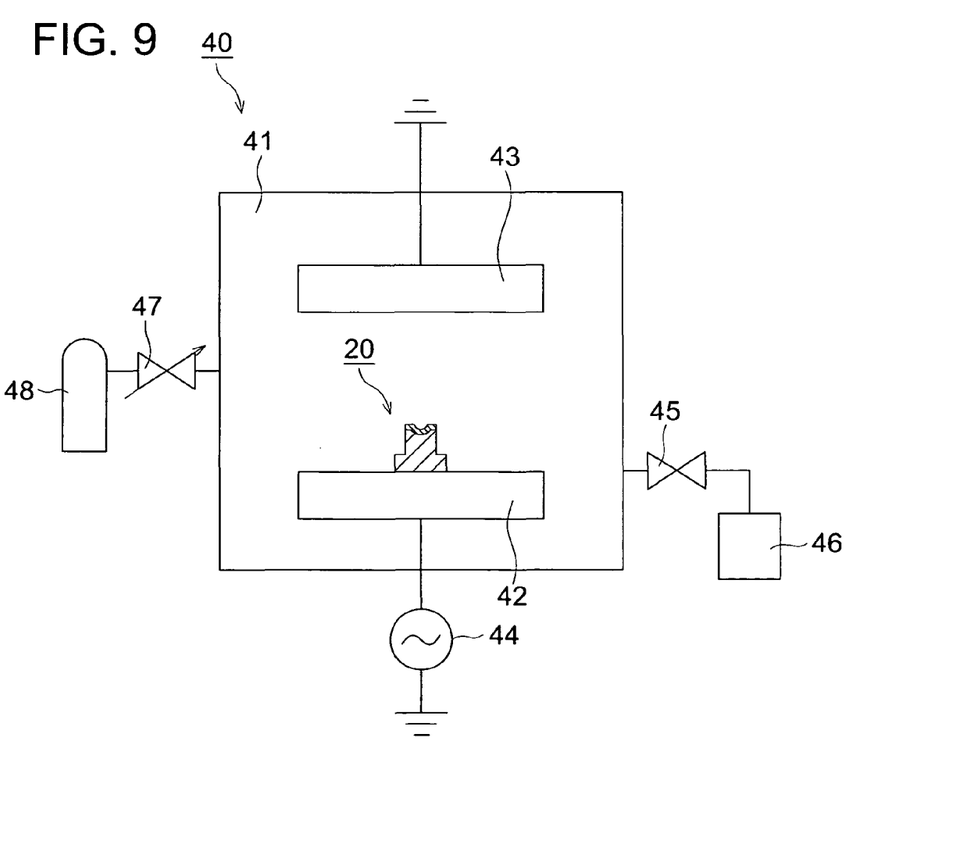
FIG. 9 is a schematic drawing to show an example of a dry etching apparatus of a parallel flat plate type.

Next, a manufacturing method of an upper mold in this embodiment will be described with reference to FIGS. 5a-9. FIGS. 5a, 5b and 5c are each a cross-sectional drawing showing the state of an upper mold in each step, and FIG. 6 is a schematic diagram showing the meaning of wet etching. FIGS. 7a, 7b, 7c and 7d are cross-sectional drawings to show a method of wet etching; FIGS. 8a and 8b are cross-sectional diagram showing a method of etching by use of a mask; and FIG. 9 is a schematic diagram showing an example of a dry etching apparatus of a parallel flat plate type.

(Substrate)

Substrate 21 of upper mold 20 is provided with molding surface 23 having a predetermined form corresponding to a molded glass object to be manufactured, in advance (FIG. 5a). Preferable materials for substrate 21 are described above. Further, the processing method is not specifically limited and any well known method is appropriately selected to be used.

(Deposition Step)

Next, cover layer 22 is deposited on substrate 21 (deposition step: FIG. 5b). This process is not an indispensable process, and molding surface 23 formed on substrate 21 may be directly subjected to a roughening treatment without performing deposition of cover layer 22. However, depending on the material of substrate 21, there may be a case that direct roughening is difficult or durability is weakened by roughening. Therefore, it is preferable that a deposition step is provided to deposit cover layer 22 before a roughening step, and the surface of deposited cover layer 22 is subjected to roughening in a roughening step.

Preferable materials for cover layer 22 include such as various kind of metal (chromium, aluminum and titanium) and nitride (chromium nitride, aluminum nitride, titanium nitride and boron nitride) and oxide (chromium oxide, aluminum oxide and titanium oxide). These films can be easily deposited and easily subjected to roughening by a method described later. Particularly, it is preferable that cover layer 22 contains at least one element among chromium, aluminum and titanium. For example, preferable are, in addition to metal chromium, metal aluminum and metal titanium, oxide and nitride thereof, and mixed substances thereof. As mentioned above, when cover layer 22 contains at least one element among chromium, aluminum and titanium, it is characteristic that these elements are oxidized by heating in the atmosphere to make a stable oxide layer on the surface. Since these oxides have a small standard free energy of formation (standard Gibbs energy of formation) and are very stable, they have a great advantage that it does not easily react even when being brought in contact with a high temperature molten glass drop. Among them, oxide of chromium is specifically stable, and it is more preferable to provide cover layer 22 containing a chromium element.

The thickness of cover layer 22 is at least as thick as being capable of forming micro roughness by roughening by means of etching and is generally preferably not less than 0.05 μm. However, when the thickness of cover layer 22 is too large, defects such as peeling off of the film may be easily generated. Therefore, the thickness of cover layer 22 is preferably 0.05 through 5 μm and specifically preferably 0.1 through 1 μm.

Cover layer 22 may be a single layer or may be constituted of plural layers of different components or different film properties. For example, an intermediate layer may be provided to enhance adhesion between substrate 21 and cover layer 22, or a protective layer may be further provided on cover layer 22 having been provided with roughness by roughening to protect the surface. Further, it is also preferable to divide cover layer into two layers (an under layer and a surface layer) having different etching rates, where the under layer having a lower etching rate is deposited on substrate 21 and the surface layer has an etching rate larger than that of the under layer is deposited on the under layer. With this constitution, since the surface layer on the uppermost surface of cover layer 22 has a larger etching rate, micro roughness can be easily formed by etching to enable uniform roughening. Further, due to the presence of the under layer under the surface layer, it is possible to improve adhesion of cover layer 22 and to prevent deterioration of substrate 21 due to influence of etching, thereby resulting in preparation of upper mold 20 having excellent durability.

The meaning of an etching rate described above will now be explained in reference to FIG. 6. The drawing on the left side of FIG. 6 shows the initial state before etching, and cover layer 22 is formed on substrate 21. The drawing on the right side shows the state after etching is performed for treatment time t. In this situation, an etching rate is defined by etching amount A (the decreased amount of the thickness of cover layer 22) divided by treatment time t. Herein, micro roughness is formed on the surface of cover layer 22 by etching, where average line 26 of the roughness is employed for measurement of the decreased amount of the thickness of cover layer 22.

Deposition method for cover layer 22 is not specifically limited and is appropriately selected from well known deposition methods. For example, listed are a vacuum deposition method, a sputtering method and a CVD method. Among them, a sputtering method is preferred because it enables easy formation of a layer having a strong adhesion property and easy control of an etching rate by controlling conditions of deposition.

In the case of forming cover layer 22 by means of a sputtering method, the etching rate becomes larger as the energy of the sputtered particles when reaching the deposition surface is smaller. In contrast, the etching rate is smaller as the energy of the sputtered particles is larger. Therefore, in a deposition process, deposition is first performed under a condition of larger energy of the sputtered particles reaching the deposition surface, and then the deposition is performed under a condition of smaller energy of the sputtered particles, whereby an under layer and a surface layer can be appropriately prepared. According to this method, it is possible to continuously deposit the under layer having a smaller etching rate and the surface layer having a larger etching rate only by changing deposition conditions without changing material of a target or facilities. The reason why cover layer 22 is made to have such a two-layer constitution is that influence of etching is prevented from reaching substrate 21 when the surface layer is subjected to etching, and that the adhesion property between substrate 21 and cover layer 22 can be improved owing to high energy deposition of the under layer.

The way how to make smaller the energy of the sputtered particles reaching the deposition surface includes, for example, to increase pressure of a sputtering gas during sputtering, to increase distance between a target ant and a deposition surface, and to decrease electric power applied to a sputtering electrode. On the contrary, the way to make greater the energy of the sputtered particles reaching the deposition surface includes, for example, to decrease pressure of a sputtering gas during sputtering, to decrease distance between a target ant and a deposition surface, and to increase electric power applied to a sputtering electrode.

[Roughening Step]

Next, a roughening step to roughen molding surface 23 is performed (roughening process: FIG. 5c). It is preferable to roughen the surface of cover layer 22 formed on substrate 21 because it is possible to uniformly roughen the surface regardless of the material of substrate 21 when the cover layer is roughened. A method of roughening is not specifically limited and is appropriately selected from methods of various etching and blast treatment. Wet etching or dry etching is preferred for easy formation of uniform roughness.

Wet etching is a method where predetermined etching solution 30 is reacted with cover layer 22 to perform roughening. The whole upper mold 20 may be immersed in etching solution 30 stored in etching bath 31 as shown in FIG. 7a, or a portion of cover layer 22 to be roughened may be immersed in etching solution 30 as shown in FIG. 7b. Alternatively, predetermined quantity of etching solution 30 may be supplied on cover layer 22 as shown in FIG. 7c, or etching solution 30 may be ejected through ejection nozzle 32 to be sprayed against cover layer 22 in a spray form as shown in FIG. 7d. By using wet etching, it is possible to efficiently perform roughening treatment having excellent uniformity at a low cost without requiring expensive and big facilities. In order to perform a stable treatment, it is preferable to maintain constant conditions of ambient temperature and illuminance of a processing room; temperature of the lower mold; number of processing; and temperature, quantity and concentration of the etching solution. On the contrary, by changing these conditions, it is possible to appropriately control depth and cycle of roughness to be formed.

Dry etching is a method in which plasma is generated by high frequency waves in an etching gas introduced in a vacuum chamber, and ions and radicals generated in the plasma roughens the cover layer 22. It is also referred to as plasma etching method and reactive ion etching (RIE) method. It is a preferable method because of small environmental load owing to no generation of waste liquid, little contamination of the surface due to foreign matter, and excellent reproducibility of processing.

An apparatus for dry etching is not specifically limited and can be appropriately selected from well known apparatuses such as a parallel plane type, a barrel (cylinder) type, a magnetron type and an ECR type. Here, a dry etching apparatus of a parallel plane type is explained as an example. Dry etching apparatus 40 shown in FIG. 9 is provided with two electrodes 42 and 43 arranged parallel to each other in vacuum chamber 41, and one electrode 42 is connected to high frequency power source 44. Upper mold 20 to be processed is placed over electrode 42, and vacuum chamber 41 is evacuated by evacuating pump 46 to a high vacuum state of an order of $10^{-3}$ Pa with bulb 45 opened. Thereafter, an etching gas is introduced from gas tank 48 through flow control valve 47, and high frequency wave is applied to electrode 42 to generate plasma between two electrodes 42 and 43. Thus, micro roughness is formed on cover layer 22 by ions and radials generated by plasma, and its surface is roughened. An etching action in the dry etching method includes a physical action by collision of ions and an action of chemical reaction of radicals, however, in this invention, roughening of cover layer may be preformed by on of the actions, or the both actions may act simultaneously. An etching gas may be an inert gas such as Ar, or may be a highly reactive gas containing F, Cl and Br.

In any of the wet etching method and dry etching method, not whole surface of cover layer 22 needs to be roughened, and at least the region to be in contact with a molten glass drop is required to be roughened. It is also preferable to employ mask 33 as shown in FIGS. 8a and 8b to prevent substrate 21 from being deteriorated by etching solution 30 and to allow only the desired region to be etched.

In the case that cover layer 22 contains a chromium element, more uniform roughening of the surface is performed by etching according to any one method among (1) through (3) described below.

(1) Wet Etching Using Acidic Solution Containing Cerium (IV) Ammonium Nitrate

It is possible to form micro roughness on the surface of cover layer 22 containing a chromium element more uniformly and in a short time, by utilizing an acidic solution containing cerium(IV) ammonium nitrate $(Ce(NH_4)_2(NO_3)_6)$. Provided that cerium(IV) ammonium nitrate is contained, a solution containing plural kinds of acid such as nitric acid and perchloric acid can be also used. The concentration of cerium(IV) ammonium nitrate is appropriately set so as to obtain a predetermined processing rate and is generally preferably 5 through 50 mass %.

(2) Wet Etching Using Alkaline Solution Containing Potassium Ferricyanide and Potassium Hydroxide It is possible to form micro roughness on the surface of cover layer 22 containing a chromium element more uniformly and in a short time, by using an alkaline solution containing potassium ferricyanide and potassium hydroxide. As an alkaline solution containing potassium ferricyanide and potassium hydroxide, for example, a mixed solution of potassium ferricyanide, potassium hydroxide and pure water can be utilized. In the etching solution, other components may be further incorporated. The ratio of potassium ferricyanide to potassium hydroxide is preferably 0.2 through 5 mass parts of potassium hydroxide against 1 mass part of potassium ferricyanide. The mixing quantity of pure water is not specifically limited and is appropriately adjusted so as to give a desired processing rate.

(3) Dry Etching Using Gas Containing Halogen

Since a gas containing halogen such as F, Cl and Br (such as $CF_4$, $SF_6$, $CHF_3$, $Cl_2$, $BCl_3$ and HBr) has a high reactivity with cover layer 22 containing a chromium element, it is possible to perform roughening in a shorter time by utilizing these gases as an etching gas. It is also effective to use a mixture gas of a halogen containing gas and another gas (such as $O_2$ and NA).

According to this embodiment, gas can easily flow along roughness formed on the surface of the upper mold for pressing a molten glass drop, where the roughness is formed by a roughening treatment by etching for forming roughnesson the surface. Therefore, it is possible to restrain generation of defects such as dents and wrinkles on a molded glass object without catching ambient gas between a molten glass drop and an upper mold at the time of press-molding.

EXAMPLES

In the following, examples practiced to confirm advantages of this invention will be explained, however, this invention is not limited thereto.

Examples 1 Through 5

First, lower mold 10 and upper mold 20 were prepared as follows. As material for both of lower mold 10 and upper mold 20, a super hard material comprising tungsten was used as a primary component. Either of molding surface 13 of lower mold 10 and molding surface 23 of upper mold 20 were precisely machined to be a spherical surface (a concave surface) having a diameter of 5 mm and having a radius of curvature of 10 mm. Thereafter, cover layer 22 of a chromium film was deposited on molding surface 23 of upper mold 20 by sputtering method. The thickness of cover layer 22 was 0.5 µm. After cover layer 22 was deposited, the surface of cover layer 22 was immersed into an etching solution to be subjected to a roughening treatment. As an etching solution, a chromium etching solution containing cerium(IV) ammonium nitride (ECR-2 manufactured by Nacalai Tesque Co., Ltd.) available on the market was used. On the other hand, lower molding 10 was not provided with cover layer 22 nor subjected to a roughening treatment.

Prepared were 5 types of upper molds 20 which had been prepared by etching the surfaces for different etching time for different surface states. Arithmetical average roughness (Ra) each were 0.008 µm (example 1), 0.01 µm (example 2), 0.1 µm (example 3), 0.2 µm (example 4) and 0.25 µm (example 5); and average length of roughness curve elements (RSm) each were 0.03 µm (example 1), 0.05 µm (example 2), 0.25 µm (example 3), 0.4 µm (example 4) and 0.5 µm (example 5). Herein, arithmetical average roughness (Ra) and average length of roughness curve elements (RSm) were measured by use of AFM (D3100 manufactured by Digital Instrument).

Molded glass objects were manufactured by use of these 5 types of upper mold 20 according to the flow chart shown in FIG. 1. The outer diameter of molded glass object manufactured was 7 mm and the aimed value of the thickness at the center thereof was 3.5 mm. Phosphoric acid type glass having a Tg of 480° C. was used as a glass material. The heating temperature in step S101 was 500° C. for lower mold 10 and 450° C. for upper mold 20. The temperature of dropping nozzle 63 at the neighborhood of its tip was set at 1,000° C. so as to drop molten glass drop 50 of approximately 190 mg. The pressing load was 1,800 N.

For molded glass objects manufactured by use of those upper molds 20, the degree of defects such as dents due to catching of ambient gas between a molten glass drop and upper mold 20 was evaluated based on microscopic observation. Herein, the case in which the total area of defects such as dents is not more than 0.0001 $mm^2$ was excellent (A), the case in which it was over 0.0001 $mm^2$ and not more than 0.001 $mm^2$ was good (B), and the case in which it was over 0.001 $mm^2$ was bad (C). Further, the arithmetical average roughness (Ra) of the upper surface (formed by having being brought in contact with upper mold 20) of a molded glass object was measured. The case In which the arithmetical average roughness is not more than 0.05 µm was excellent (A), the case in which it is over 0.05 µm and not more than 0.2 µm was good (B). The evaluation results will be summarized in table 1.

TABLE 1

|  | Molding surface 23 of upper mold 20 | | Evaluation of molded glass object | |
| --- | --- | --- | --- | --- |
|  | Ra (µm) | RSm (µm) | Area of defects | Ra of upper surface |
| Example 1 | 0.008 | 0.03 | B | A |
| Example 2 | 0.01 | 0.05 | A | A |
| Example 3 | 0.1 | 0.25 | A | A |
| Example 4 | 0.2 | 0.4 | A | A |
| Example 5 | 0.25 | 0.5 | A | B |
| Comparison 1 | 0.005 | 0.01 | C | A |

In any case of examples 1 through 5, it has been confirmed that the advantage of this invention that the area of defects such as dents generated on a molded glass object was small and generation of defects was restrained. In particular, in the cases (examples 2 through 4) in which arithmetical average roughness (Ra) was 0.01 to 0.2 μm and average length of roughness curve elements (RSm) was not more than 0.5 μm, it has been confirmed that both of the area of defects such as dents and the arithmetical average roughness (Ra) of the upper surface of a molded glass object were excellent.

Comparative Example 1

Lower mold 10 and upper mold 20 were prepared in a similar manner to the examples. However, upper mold 20 was not subjected to a roughening treatment after forming cover layer 22 on molding surface 23. The arithmetical average roughness (Ra) of cover layer 22 was 0.005 μm and the average length of roughness curve elements (RSm) was 0.01 μm. Molded glass objects was prepared in a similar manner to examples 1 through 5 by using this upper mold 20, and the area of defects such as dents and arithmetical average roughness (Ra) of the upper surface of the molded glass object were evaluated. The evaluation results are also shown in table 1.

Under a condition of the comparative example, the total area of defects such as dents due to sealing of ambient gas caught between a molten glass drop and upper mold 20 was over 0.001 mm$^2$, and a good molded glass object was not obtained.

What is claimed is:

1. A method for manufacturing a molded glass object, the method comprising:

forming an under layer on a surface of a base of an upper mold, the under layer having the property of a first intrinsic etching rate when the under layer is subjected to an etching process;

forming a surface layer as a molding surface on the under layer, the surface layer having the property of a second intrinsic etching rate when the surface layer is subjected to the etching process;

the first intrinsic etching rate being smaller than the second intrinsic etching rate;

roughening a surface of the surface layer by carrying out the etching process for the surface, wherein the under layer prevents the base of the upper mold from being influenced by the etching;

with respect to a lower mold having a molding surface formed without undergoing a roughening process, dropping a molten glass drop onto the molding surface of the lower mold from a dropping nozzle connected to a melting bath in which molten glass is stored, the dropping nozzle being arranged over and apart from the lower mold; and press-molding the dropped molten glass drop between the lower mold and the upper mold facing the lower mold.

2. The method of claim 1, wherein the molding surface of the upper mold has an arithmetical average roughness Ra of 0.01 μm through 0.2 μm and an average length RSm of a roughness curve element of 0.5 μm or less.

* * * * *